UNITED STATES PATENT OFFICE.

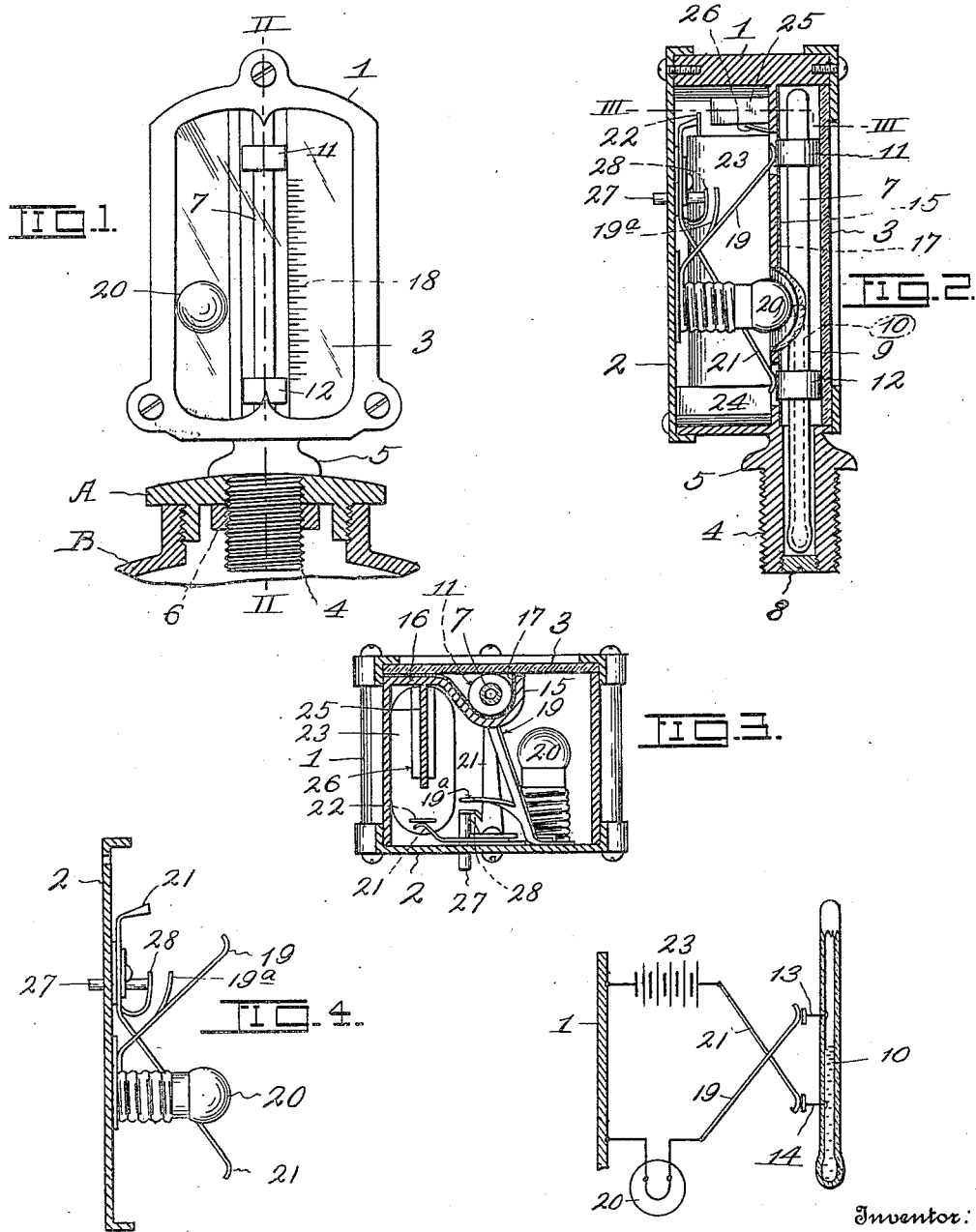

JOHN M. JOHNSON, OF KANSAS CITY, MISSOURI.

THERMOSTATIC INDICATOR.

1,243,608.

Specification of Letters Patent.  Patented Oct. 16, 1917.

Application filed July 19, 1915, Serial No. 40,702. Renewed May 24, 1917. Serial No. 170,779.

*To all whom it may concern:*

Be it known that I, JOHN M. JOHNSON, a citizen of the United States, residing at Kansas City, in the county of Jackson and State of Missouri, have invented certain new and useful Improvements in Thermostatic Indicators, of which the following is a specification.

My invention relates to thermostatic indicators for disclosing the temperature of automobile radiators and the temperature of the water therein, and my object is to provide a simple instrument of this character which will not only plainly indicate such temperature, but will also close a signal circuit should the temperature reach an abnormal degree and prevent the water from performing its function of cooling the automobile motor.

In order that the invention may be fully understood, reference will now be made to the accompanying drawing, in which:

Figure 1 is a front elevation of the indicator applied to the upper portion of a radiator.

Fig. 2 is an irregular vertical section of the indicator on line II—II of Fig. 1.

Fig. 3 is a horizontal section of the indicator on line III—III of Fig. 2.

Fig. 4 is a vertical section of the back plate of the indicator case with parts assembled thereon.

Fig. 5 is a diagram of a signal circuit constituting part of the invention.

In carrying out the invention, I employ a casing 1 having a removable back plate 2 and provided at its open front side with a pane of glass 3, through which a signal light hereinafter described may be seen.

The lower portion of the casing 1 has a threaded neck 4 adapted to be threaded through the filler cap A of an automobile radiator B, into which the lower portion of the neck extends. The neck 4 is firmly secured to the cap A by a peripheral shoulder 5, engaging the top of said cap, and a lock nut 6 threaded on the neck 4 and engaging the underside of the cap.

7 designates a thermostat arranged centrally in the front portion of the casing 1 and extending from the top thereof down into the neck 4, which is closed at its lower end by a threaded plug 8, to prevent water in the radiator B from splashing upward against the bulb at the lower portion of the thermostat 7.

The thermostat 7 consists of a glass tube 9 and mercurial column 10. The tube 9 is embraced at its upper and lower portions by annular electrodes 11 and 12 provided with wire terminals 13 and 14, respectively, fused in the glass tube 9 and extending into the path of the mercurial column 10, which performs the function of an automatic switch in closing an electric circuit of which the electrodes 11 and 12 and the annular terminals 13 and 14, constitute a part.

The thermostat 7 is firmly held in place by a segmental portion 15 of the front wall 16 of the casing 1. A sheet of insulation 17 is interposed between the electrodes 11 and 14 and the front wall 16 to prevent short circuiting of the signal circuit hereinafter described. Said sheet of insulation 17 also has a scale 18 thereon for coöperation with the mercurial column 10, in indicating the temperature of the water in the radiator B.

19 designates a contact arm, one terminal of which communicates with one pole of an incandescent signal lamp 20, while its opposite terminal extends through registering openings in the wall 16 and the insulation 17, and contacts with the electrode 11. The lamp 19 is placed in the casing 1 to illuminate the glass 3 when the electric circuit is closed.

21 designates a contact arm having its lower terminal extending through registering openings in the wall 16 and the insulation 17 to contact the electrode 12, while its opposite terminal contacts the pole 22 of a battery 23 frictionally held in the casing 1 by interior ribs 24 and 25, integral with the bottom and top, respectively, of the casing 1. The opposite pole 26 of the battery 23 is grounded on the rib 25, as disclosed by Fig. 2.

27 designates a push-button provided with a switch 28 having one terminal connected to the contact arm 21 and its opposite terminal adapted to be pressed into engagement with a finger 19ª on the contact arm 19, for the purpose of closing the signal circuit and thus testing the battery to determine whether or not it is necessary to renew the same.

In practice the mercurial column 10 normally submerges the wire terminal 14, and should the temperature within the radiator become abnormal and cause said mercurial column 10 to expand into contact with the wire terminal 13, the signal circuit closes and causes the lamp 20 to glow through the passage of current from the battery 23, through the contact arm 21, the electrode 12, the wire terminal 14, the mercurial column 10, the wire terminal 13, the electrode 11, the contact arm 19, the lamp 20, and thence back to the battery through the casing 1 and the pole 26.

While I have shown the signal circuit equipped with a visual signal for indicating abnormal temperature of the radiator, it is obvious that an audible signal may be employed if desired, without departing from the spirit of my invention.

Having thus described my invention, what I claim and desire to secure by Letters Patent, is:

1. In combination with a casing, having a back and sides, a front wall having a concaved part which faces outwardly, a glass cover extending over said front wall, a thermostat in said concaved part, said wall having openings, a pair of electrodes on the thermostat engaging the cover and extending into said openings, a signal, a contact arm extending from the signal through one of said openings and engaged with the electrode of that opening, a battery, a contact arm extending through from the battery and through the other opening and engaged with the electrode of that opening.

2. In combination with a casing, having a back and sides, a front wall having a concaved part which faces outwardly, a glass cover extending over said front wall, a thermostat in said concaved part, said wall having openings, a pair of electrodes on the thermostat engaging the cover and extending into said openings, said wall extending from one side of the casing to a point spaced from the other side, a battery to the rear of said wall, a lamp alined with the space between said wall and said other side of the casing, and contact arms extending from the battery and lamp through the wall openings and engaged with the respective electrodes.

3. In combination with a casing having a front wall formed with an outwardly facing concave part and openings, a thermostat having a pair of electrodes which aline with said openings, a battery and a signal in the casing, contact arms connected to the battery and signal and alined with said openings and contacting with said electrodes, and a cover for the front wall to hold the thermostat in said concaved part.

4. In combination with a casing having a bottom, a neck connected to the bottom, the bottom having an opening communicating with said neck, a rigid plate borne by said bottom, a thermostat abutting the plate and having its lower end loosely extending through the bottom opening and into the neck, electrodes on the thermostat, a cover plate holding the thermostat against the plate, a battery and signal, and contact arms between the battery, signal and electrodes.

In testimony whereof I affix my signature, in the presence of two witnesses.

JOHN M. JOHNSON.

Witnesses:
FRED C. FISCHER,
L. J. FISCHER.